US011372605B2

(12) United States Patent
Lee (10) Patent No.: US 11,372,605 B2
(45) Date of Patent: Jun. 28, 2022

(54) IMAGE FORMING APPARATUS, METHOD FOR ORDERING CONSUMABLE PRODUCT IN IMAGE FORMING APPARATUS, AND MEDIUM STORING PROGRAM EXECUTABLE BY IMAGE FORMING APPARATUS (71) Applicant: Brother Kogyo Kabushiki Kaisha, Nagoya (JP)

(72) Inventor: Tony Lee, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/579,129

(22) Filed: Sep. 23, 2019

(65) Prior Publication Data
US 2020/0104083 A1 Apr. 2, 2020

(30) Foreign Application Priority Data
Sep. 28, 2018 (JP) .............................. JP2018-184919

(51) Int. Cl.
*G06Q 10/08* (2012.01)
*G06F 3/12* (2006.01)

(52) U.S. Cl.
CPC .......... *G06F 3/1239* (2013.01); *G06F 3/1207* (2013.01); *G06F 3/1219* (2013.01); *G06F 3/1229* (2013.01); *G06F 3/1268* (2013.01)

(58) Field of Classification Search
USPC .............. 358/1.1–3.29, 1.11–1.18, 500–504; 399/8–25, 75–83
See application file for complete search history.

(56) References Cited

U.S. PATENT DOCUMENTS

| 5,970,475 | A | * | 10/1999 | Barnes | ............... | G06Q 30/0641 |
| | | | | | | 705/26.81 |
| 8,120,804 | B2 | * | 2/2012 | Isobe | ................... | H04N 1/4433 |
| | | | | | | 358/448 |
| 2001/0004734 | A1 | | 6/2001 | Kudoh et al. | | |
| 2008/0017706 | A1 | * | 1/2008 | Malik | ................ | G06Q 30/0641 |
| | | | | | | 235/383 |

(Continued)

FOREIGN PATENT DOCUMENTS

| JP | H10-309851 A | 11/1998 |
| JP | 2001-175719 A | 6/2001 |

(Continued)

*Primary Examiner* — Marcellus J Augustin
(74) *Attorney, Agent, or Firm* — Banner & Witcoff, Ltd.

(57) ABSTRACT

An image forming apparatus includes: a communication interface configured to communicate with an order receiving apparatus; a memory configured to store an upper limit value of the number of orders of the consumable product and administrator's authentication information; an input device; an output device; and a controller. The controller determines whether the number of orders of the consumable product inputted via the input device is more than the upper limit value. When the controller has determined that the number of orders is more than the upper limit value, the controller requests input of authentication information via the output device. The controller determines whether the authentication information inputted via the input device in response to the request matches the administrator's authentication information.

13 Claims, 7 Drawing Sheets (56) References Cited

U.S. PATENT DOCUMENTS

| | | | |
|---|---|---|---|
| 2010/0247132 A1* | 9/2010 | Shustef | G06Q 30/0601 399/79 |
| 2012/0109767 A1* | 5/2012 | Bullock | G06Q 20/425 705/26.1 |
| 2012/0176636 A1* | 7/2012 | Ormond | G03G 15/5079 358/1.13 |
| 2013/0151373 A1* | 6/2013 | Flanagan | G06Q 30/0607 705/26.25 |
| 2013/0185167 A1* | 7/2013 | Mestre | G06Q 20/20 705/21 |
| 2016/0062293 A1* | 3/2016 | Nakamura | G03G 15/553 399/8 |

FOREIGN PATENT DOCUMENTS

| | | |
|---|---|---|
| JP | 2003-187123 A | 7/2003 |
| JP | 2007-011813 A | 1/2007 |
| JP | 2007-279944 A | 10/2007 |

* cited by examiner

|  | CARTRIDGE(C) 51 | CARTRIDGE(M) 52 | CARTRIDGE(Y) 53 | CARTRIDGE(K) 54 |
|---|---|---|---|---|
| INITIAL UPPER LIMIT VALUE | x1 | x2 | x3 | x4 |
| INITIAL TOTAL UPPER LIMIT VALUE | X | | | |
| ORDER HISTORY | y1 | y2 | y3 | y4 |

IMAGE FORMING APPARATUS, METHOD FOR ORDERING CONSUMABLE PRODUCT IN IMAGE FORMING APPARATUS, AND MEDIUM STORING PROGRAM EXECUTABLE BY IMAGE FORMING APPARATUS

CROSS REFERENCE TO RELATED APPLICATION

The present application claims priority from Japanese Patent Application No. 2018-184919 filed on Sep. 28, 2018, the disclosure of which is incorporated herein by reference in its entirety.

BACKGROUND

Field of the Invention

The present invention relates to an image forming apparatus configured to form an image by using a consumable product such as an ink cartridge, a method for ordering the consumable product in the image forming apparatus, and a program executable by the image forming apparatus.

Description of the Related Art

As the technology related to an order for a consumable product used in an image forming apparatus, there is known a technology in which an email with an order form (an order sheet or purchase order) of the consumable product is sent to an administrator of peripheral equipment (the image forming apparatus) when the remaining amount of the consumable product is equal to or less than a lower limit value. This technology allows the email to be directly sent from the peripheral equipment to a supplier without going through the administrator.

SUMMARY

When the consumable product is ordered directly from the image forming apparatus without going through the administrator (a person having the authority related to order management of the consumable product), a user (a person who is not the administrator) of the image forming apparatus may intentionally or erroneously order the consumable product(s) more than necessary. Such an unnecessary order increases costs for purchasing the consumable product(s).

An object of the present disclosure is to provide an image forming apparatus that is capable of inhibiting an unnecessary order by a user who is not an administrator, a method for ordering a consumable product in the image forming apparatus, and a program executable by the image forming apparatus.

According to a first aspect of the present disclosure, there is provided an image forming apparatus configured to form an image by using a consumable product, the apparatus including: a communication interface configured to communicate with an order receiving apparatus; a memory configured to store an upper limit value of the number of orders of the consumable product and administrator's authentication information; an input device; an output device; and a controller configured to: determine whether the number of orders of the consumable product inputted via the input device is more than the upper limit value; request input of authentication information via the output device, in a case that the controller has determined that the number of orders is more than the upper limit value, and determine whether the authentication information inputted via the input device in response to the request matches the administrator's authentication information.

According to a second aspect of the present disclosure, there is provided a method for ordering a consumable product in an image forming apparatus that is configured to form an image by using the consumable product and that includes: a communication interface configured to communicate with an order receiving apparatus; a memory configured to store an upper limit value of the number of orders of the consumable product and administrator's authentication information; an input device; and an output device, the method including: determining whether the number of orders of the consumable product inputted via the input device is more than the upper limit value; requesting input of authentication information via the output device, in a case that the controller has determined that the number of orders is more than the upper limit value; and determining whether the authentication information inputted via the input device in response to the request matches the administrator's authentication information.

According to a third aspect of the present disclosure, there is provided a non-transitory computer-readable medium storing an order program that is executable by an image forming apparatus configured to form an image by using a consumable product, the image forming apparatus including: a communication interface configured to communicate with an order receiving apparatus; a memory configured to store an upper limit value of the number of orders of the consumable product and administrator's authentication information; an input device; an output device; and a controller, the order program, when executed by a processor of the controller, causing the controller to: determine whether the number of orders of the consumable product inputted via the input device is more than the upper limit value; request input of authentication information via the output device, in a case that the number of orders is more than the upper limit value, and determine whether the authentication information inputted via the input device in response to the request matches the administrator's authentication information.

According to the present disclosure, when the number of orders is more than the upper limit value, the authentication is required, and whether a person performing the order is the administrator is checked. This inhibits an unnecessary order which may otherwise be performed by any user who is not the administrator.

When the controller has determined that the number of orders is equal to or less than the upper limit value, the controller may be configured to send the number of orders inputted via the input device to the order receiving apparatus via the communication interface. When the number of orders does not exceed the upper limit value, the authentication is not requested, and the order can be performed as it is. This makes the order easy.

When the controller has determined that the authentication information inputted via the input device matches the administrator's authentication information, the controller may be configured to send the number of orders inputted via the input device to the order receiving apparatus via the communication interface. When the person performing the order is the administrator, an order exceeding the upper limit value is allowed. This enables a lot of orders as necessary, improving usability.

The image forming apparatus according to the present disclosure may include a remaining amount sensor configured to detect a remaining amount of the consumable product. The memory may be configured to store a lower limit value of the remaining amount of the consumable product. The controller may be configured to determine whether the remaining amount detected by the remaining amount sensor is equal to or less than the lower limit value, and request input of the authentication information when the controller has determined that the number of orders is more than the upper limit value and when the remaining amount is more than the lower limit value. The authentication is requested when the remaining amount is large, and an unnecessary order can thus be reliably inhibited.

The controller may be configured to send the number of orders inputted via the input device to the order receiving apparatus via the communication interface, when the controller has determined that the remaining amount is equal to or less than the lower limit value. When the remaining amount is small, the authentication is not required, and thus the order can be performed as it is. This makes the order easy.

The consumable product may include a first consumable product and a second consumable product. The upper limit value may include a first upper limit value that is an upper limit value of the number of orders of the first consumable product and a second upper limit value that is an upper limit value of the number of products of the second consumable product. The controller may be configured to separately determine whether the number of orders of the first consumable product inputted via the input device is more than the first upper limit value and to determine whether the number of orders of the second consumable product inputted via the input device is more than the second upper limit value. The controller executes the determination depending on the kind of consumable product when multiple kinds of consumable products are used in the image forming apparatus. This inhibits an unnecessary order for each of the consumable products.

The upper limit value may further include a total upper limit value that is an upper limit value of a total of the number of orders of the first consumable product and the number of orders of the second consumable product. The controller may be configured to further determine whether the total of the number of orders of the first consumable product and the number of orders of the second consumable products inputted via the input device is more than the total upper limit value. This inhibits an unnecessary order for all the kinds of the consumable products.

The memory may be configured to store an initial upper limit value of the number of orders of the consumable product and an order history that is the number of orders of the consumable product in a predefined period. The upper limit value may be a value obtained by subtracting the order history from the initial upper limit value. Reflecting the order history on the determination reliably inhibits an unnecessary order.

The image forming apparatus according to the present disclosure may further include an installation portion in which the consumable product is installed, and an installation/removal sensor that is configured to detect installation/removal of the consumable product with respect to the installation portion. The controller may be configured to reset the order history stored in the memory when the installation/removal sensor has detected one or more times of the installation/removal of the consumable product. Reflecting storages that are not in use on the determination reliably inhibits an unnecessary order.

The memory may be configured to further store the administrator's authority information. The controller may be configured to determine whether the administrator's authority information is inputted via the input device. When the controller has determined that the administrator's authority information is inputted via the input device, the controller may be configured not to determine whether the number of orders of the consumable product inputted via the input device is more than the upper limit value. When the image forming apparatus is operated by the administrator, such as a case in which the administrator has logged in, the controller does not determine whether the number of orders of the consumable product inputted via the input device is more than the upper limit value. This simplifies the control process and reduces the burden related to control on the apparatus.

The controller may be configured to notify a user the upper limit value via the output device, when the controller has determined that the administrator's authority information is not inputted. The user who is not the administrator is notified of the upper limit value. This prompts the user to input the number of orders of equal to or less than the upper limit value.

The controller may be configured to notify a user disapproval of order via the output device, when the controller has determined that the authentication information inputted via the input device in response to the request does not match the administrator's authentication information. When the person performing the order is not the administrator, an order exceeding the upper limit value is not allowed. This reliably inhibits an unnecessary order which may otherwise be performed by any user who is not the administrator.

The controller may be configured to further notify the user the upper limit value via the output device, when the disapproval of order is notified. Since the user is prompted to input the number of orders of equal to or less than the upper limit value, the order can be completed without interruption.

According to the present disclosure, when an order exceeding the upper limit value is performed, the authentication is required to check whether the person performing the order is the administrator. This inhibits an unnecessary order which may otherwise be performed by any user who is not the administrator.

DESCRIPTION OF THE EMBODIMENTS

<Schematic Configuration of System>

Figure 1:
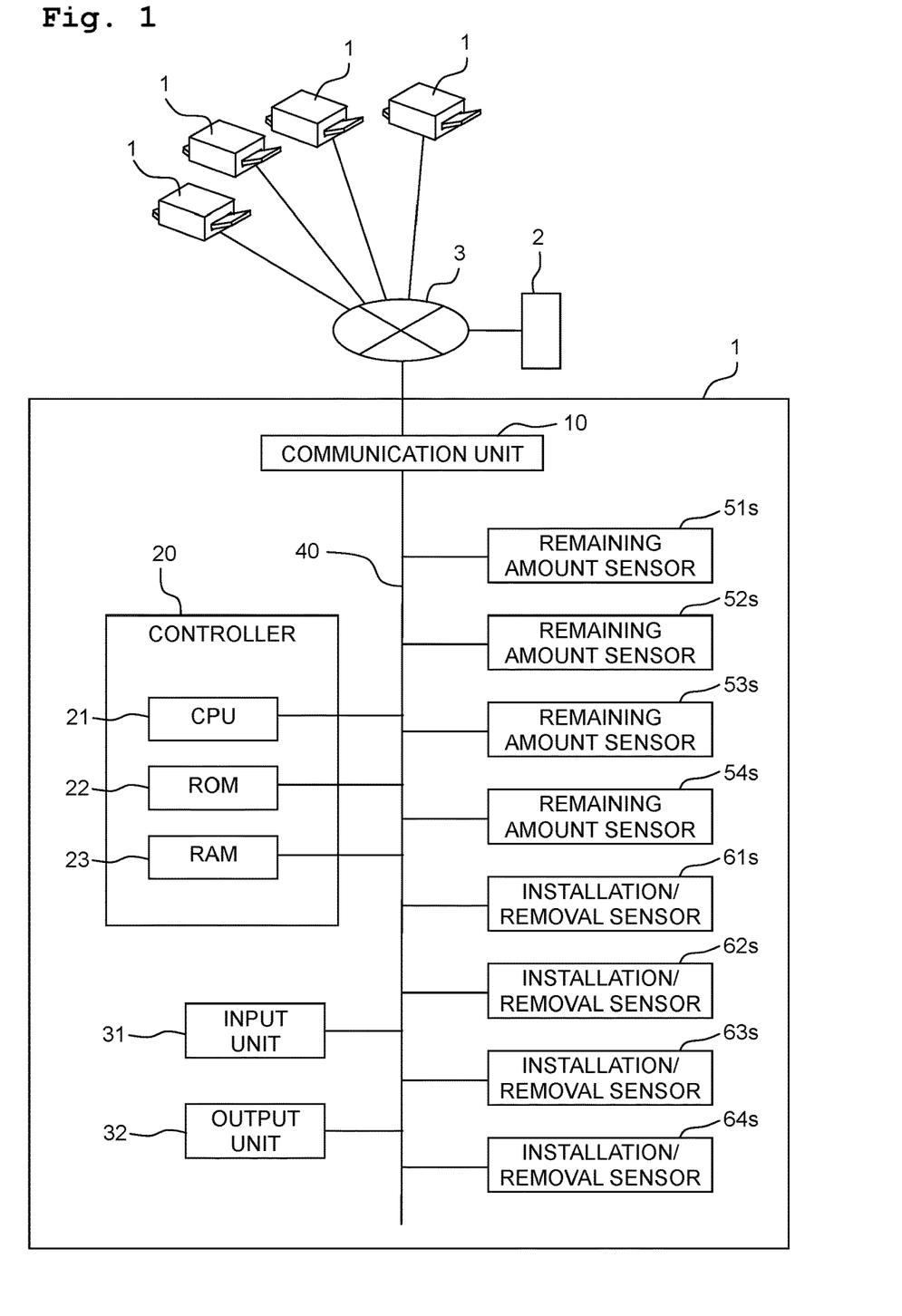
FIG. 1 depicts a schematic configuration of a system including printers each of which is an exemplary image forming apparatus of the present disclosure.

A system depicted in FIG. 1 includes printers 1 connected to each other via a network 3 and an order receiving apparatus 2. The printer 1 is an exemplary image forming apparatus of the present disclosure.

The printers 1 are placed, for example, in the same office and an administrator (a person who has the authority related to order management of cartridges that are consumable products) administers the printers 1. The administrator and users (people who are not the administrator, for example, general employees working in the office except for the administrator) can login to the respective printers 1 using individual authority information, and they can order cartridges of the respective printers 1.

The order receiving apparatus 2 is placed, for example, outside the office. A supplier of cartridges administers the order receiving apparatus 2.

<Configuration of Printer>

As depicted in FIG. 1, the printer 1 includes a communication unit 10, a controller 20, an input unit 31, an output unit 32, four remaining amount sensors Ms to 54s, and four installation/removal sensors 61s to 64s. Those are connected to each other via an internal bus 40.

The communication unit 10 is an interface for allowing the printer 1 to communicate with external apparatuses (the order receiving apparatus 2, other personal computers, and the like).

The controller 20 includes a Central Processing Unit (CPU) 21, a Read Only Memory (ROM) 22, and a Random Access Memory (RAM) 23. The ROM 22 stores data and programs by which the CPU 21 executes a variety of controls. The RAM 23 temporarily stores data used when the CPU 21 executes the programs.

The input unit 31 (an exemplary input device of the present disclosure) includes, for example, a touch panel and buttons. The input unit 31 includes an order button described below.

The output unit 32 (an exemplary output device of the present disclosure) includes, for example, a display and a speaker.

Figure 2:
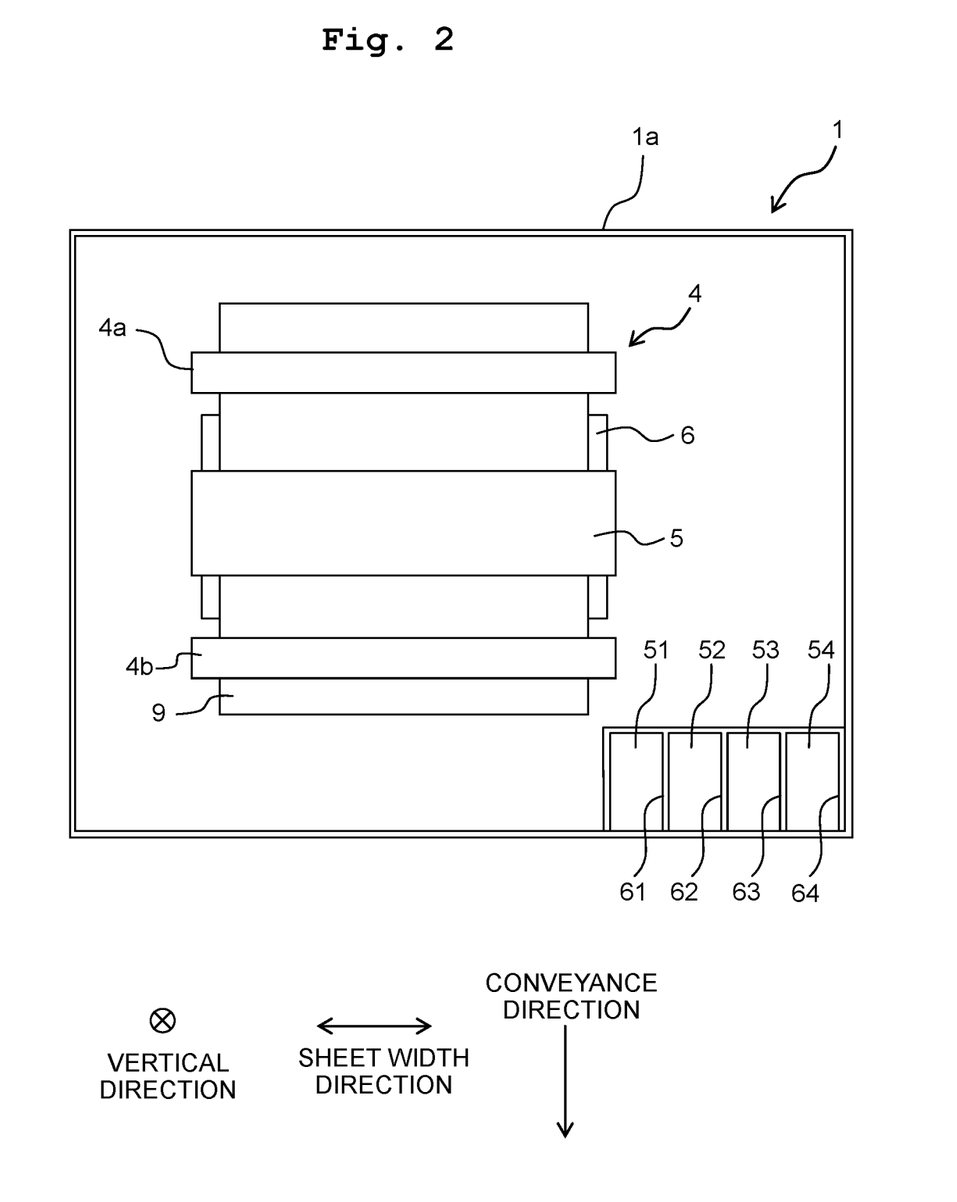
FIG. 2 is a plan view of the printer in FIG. 1.

As depicted in FIG. 2, the printer 1 includes a casing 1a. A conveyer 4, a head 5, and a platen 6 are placed in the casing 1a.

The casing 1a includes four installation portions 61 to 64. Four cartridges 51 to 54 are removably installed in the four installation portions 61 to 64. The cartridges 51 to 54 contain respective color inks of cyan, magenta, yellow, and black.

The remaining amount sensors 51s to 54s and the installation/removal sensors 61s to 64s in FIG. 1 are provided in the installation portions 61 to 64, respectively. The remaining amount sensors 51s to 54s detect the ink remaining amounts of cartridges 51 to 54 installed in the installation portions 61 to 64, and then send signals indicating the remaining amounts to the controller 20. The installation/removal sensors 61s to 64s detect the installation/removal of the cartridges 51 to 54 with respect to the installation portions 61 to 64, and send signals indicating the installation/removal (e.g., an ON signal when the cartridge is installed in the installation portion, and an OFF signal when the cartridge is not installed in the installation portion) to the controller 20.

The conveyer 4 includes two roller pairs 4a and 4b arranged to interpose the platen 6 therebetween in a conveyance direction. Driving a conveyance motor (not depicted in the drawings) rotates the roller pairs 4a and 4b nipping a sheet 9, thus conveying the sheet 9 in the conveyance direction.

The head 5 is a line-type ink-jet head (a head discharging ink on the sheet 9 conveyed by the conveyer 4 in a state where the position of the head is fixed). A lower surface of the head 5 is formed having nozzles (not depicted in the drawings). The head 5 communicates with the four cartridges 51 to 54 via tubes or the like. The head 5 includes four reservoirs that temporarily contain the inks of four colors (cyan, magenta, yellow, and black) supplied from the four cartridges 51 to 54, and channels ranging from the four reservoirs to the respective nozzles.

The platen 6, which is a flat-plate member, is disposed below the head 5 at a position between the two roller pairs 4a, 4b in the conveyance direction.

The CPU 21 (see FIG. 1) controls a driver IC and the conveyance motor (both of them are not depicted in the drawings) of the head 5 in accordance with the programs and data stored in the ROM 22 and RAM 23 based on a recording command input from the external apparatus, such as a PC. This discharges ink from the nozzles of the head 5 on the sheet 9 conveyed by the conveyer 4, forming an image. Inks in the cartridges 51 to 54 are consumed for the image formation.

<Order Program>

Figure 3A:
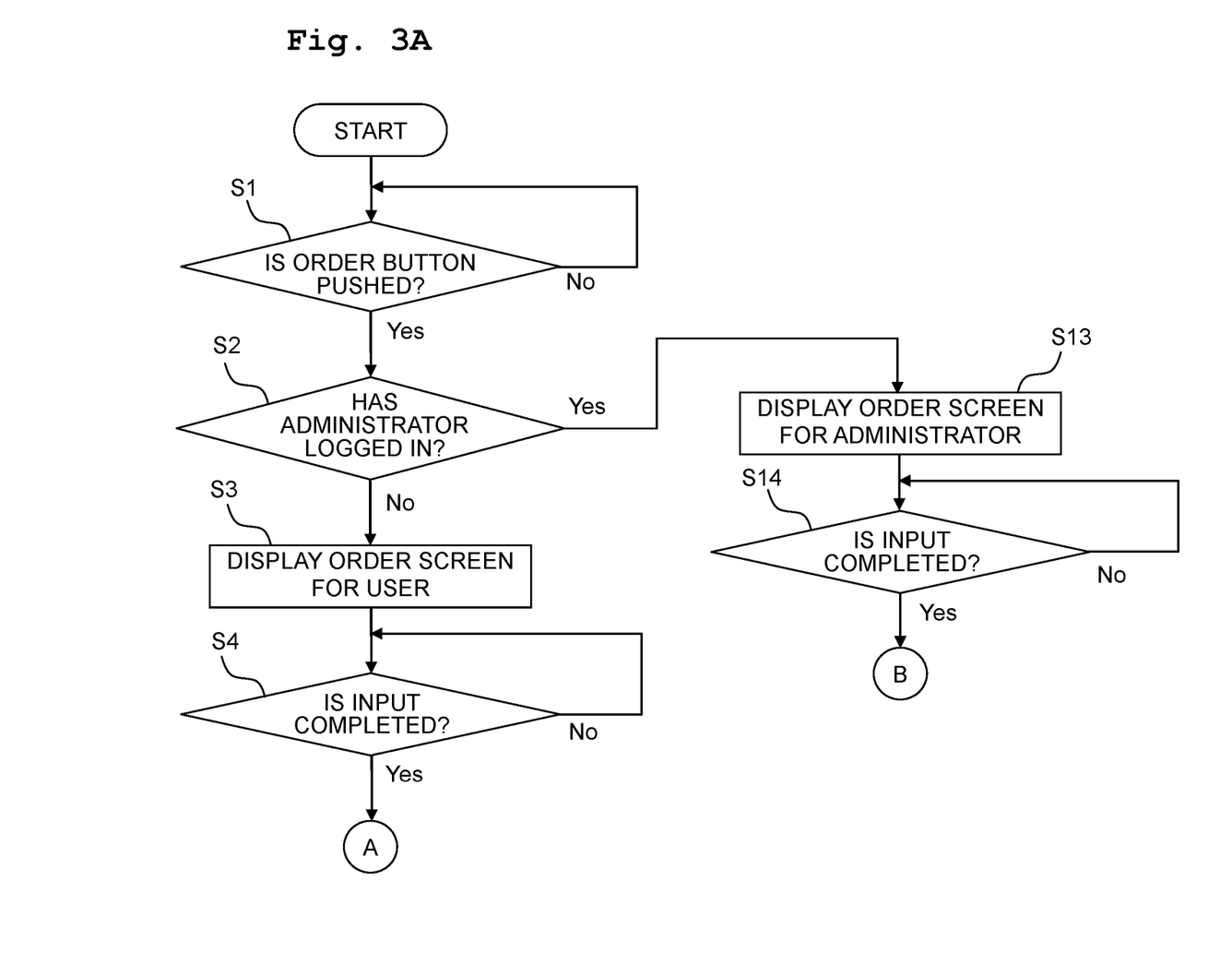
FIGS. 3A and 3B are a flowchart showing an order program executed by a CPU of each printer in FIG. 1.
Figure 3B:
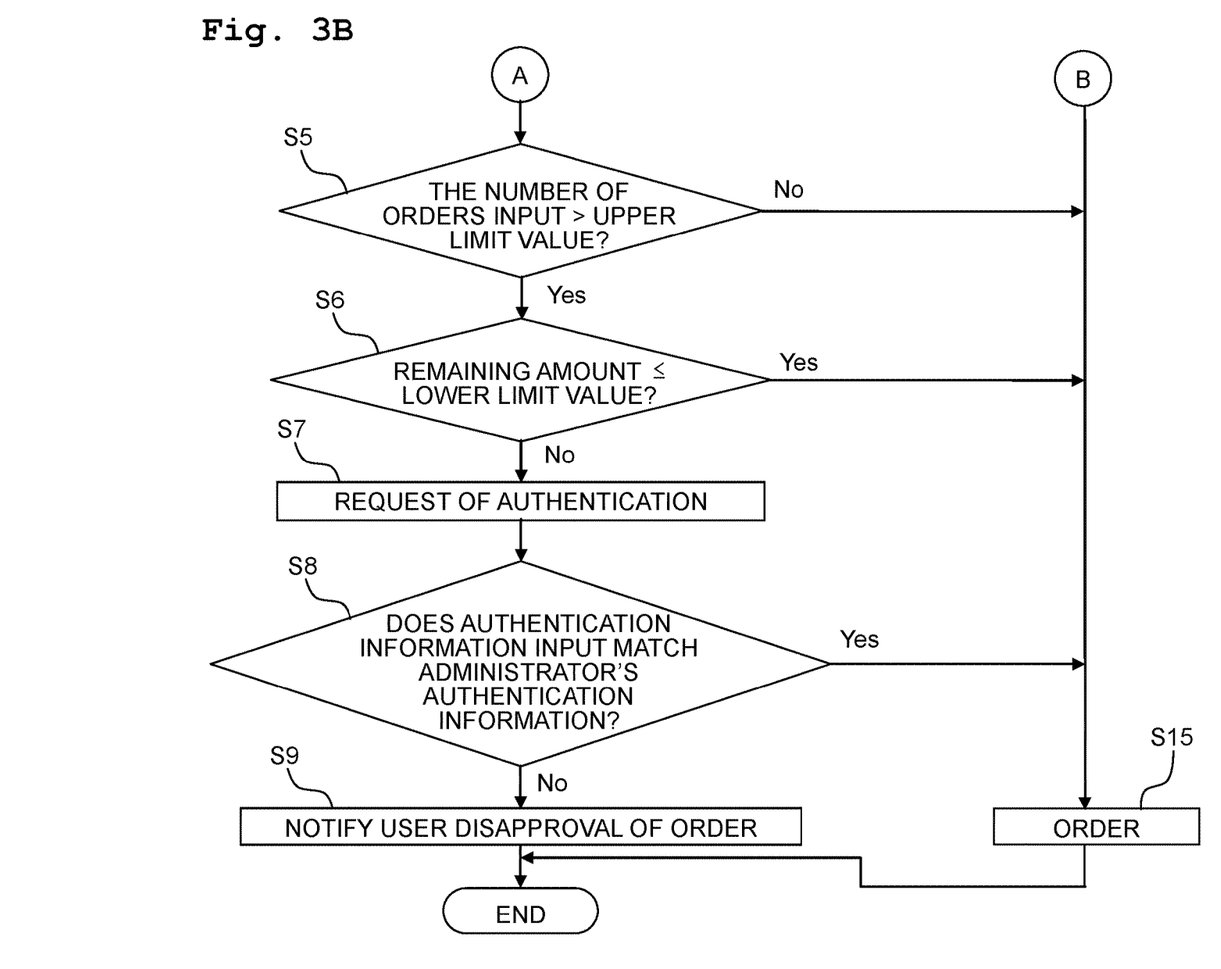

Referring to FIGS. 3A and 3B, an order program executed by the CPU 21 is explained.

The order program and data used for the order program are stored in the ROM 22.

Specifically, the ROM 22 stores authority information of the administrator and each user as well as administrator's authentication information. The authority information is information that is individually allocated for each user and the administrator to identify a person who is using the printer 1. The administrator's authentication information is information that is set by the administrator in advance to put a restriction on the order for cartridges. It is possible to use, for example, a personal identification number (PIN), a password, and a fingerprint as the authority information and the administrator's authentication information.

Figure 4:
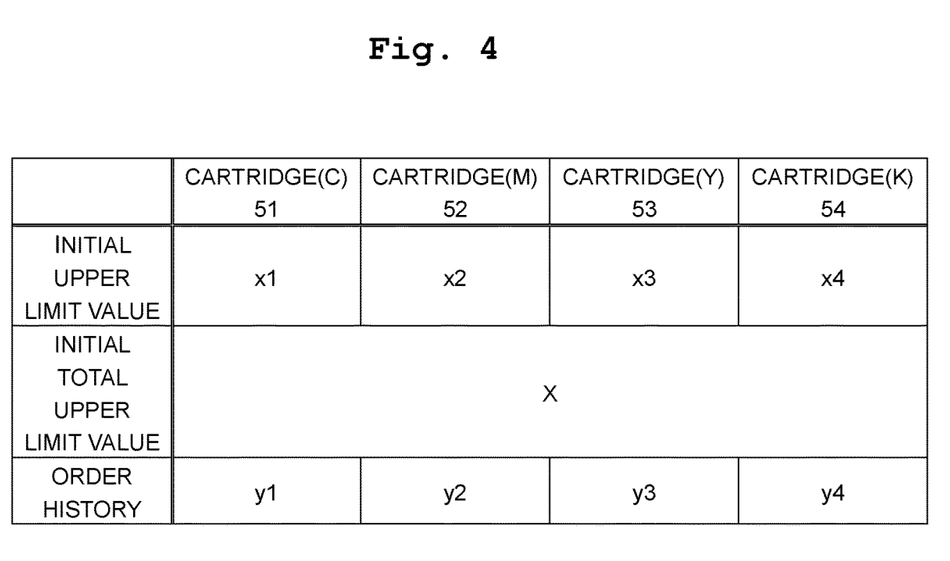
FIG. 4 is a table stored in a ROM of each printer in FIG. 1.

As shown in FIG. 4, the ROM 22 stores initial upper limit values x1 to x4 that are set by the administrator in advance as upper limit values of the number of orders of the respective cartridges 51 to 54, and an initial total upper limit value X that is set by the administrator in advance as a total upper limit value of the number of orders of all the cartridges 51 to 54.

As shown in FIG. 4, the ROM 22 stores order histories y1 to y4 that indicate the number of orders of the respective cartridges 51 to 54 during a predefined period. When the installation/removal sensors 61s to 64s detect one or more times of the installation/removal, the CPU 21 resets the order histories y1 to y4 stored in the ROM 22 (the order histories y1 to y4 stored in the ROM 22 are set to zero). Namely, the predefined period is a period during which replacement of each of the cartridges 51 to 54 is performed one or more times. The count and reset of the number of orders are performed for each of the cartridges 51 to 54.

In the processing in S3, S5, and S13, the upper limit value is used for each of the cartridges 51 to 54. The upper limit value is a value obtained by subtracting each of the order histories y1 to y4 from the corresponding one of the initial upper limit values x1 to x4. The total upper limit value is used in the processing in S3, S5, and S13. The total upper limit value is a value obtained by subtracting the order histories y1 to y4 of all the cartridges 51 to 54 from the initial total upper limit value X.

The ROM 22 stores lower limit values of ink remaining amounts of the respective cartridges 51 to 54. The lower limit values of the cartridges 51 to 54 may be different from each other.

The CPU 21 reads the order program and the above information from the ROM 22 and executes the following processing.

The CPU 21 first determines whether the order button of the input unit 31 is pushed (S1). When the CPU 21 has determined that the order button is not pushed (S1: NO), the CPU 21 repeats the processing in S1.

When the CPU 21 has determined that the order button is pushed (S1: YES), the CPU 21 determines (S2: third determination processing) whether the administrator has logged in (i.e., the administrator's authority information is inputted via the input unit 31).

When the CPU 21 has determined that the administrator does not log in (a user has logged in) (S2: NO), the CPU 21 displays an order screen for user on the display of the output unit 32 (S3). In addition to model numbers and the number of orders of the cartridges 51 to 54, the order screen for user includes the upper limit values and the total upper limit value of the number of orders of the cartridges 51 to 54.

When the CPU 21 has determined that the administrator has logged in (S2: YES), the CPU 21 displays an order screen for administrator on the display of the output unit 32 (S13). The order screen for administrator includes model numbers and the number of orders of the cartridges 51 to 54, but does not include the upper limit values and the total upper limit value of the number of orders of the cartridges 51 to 54.

After the processing in S3, the CPU 21 determines whether the input related to the order is completed (S4). For example, when an input completion button of the input unit 31 is pushed, the CPU 21 determines that the input is completed. When the CPU 21 has determined that the input related to the order is not completed (S4: NO), the CPU 21 repeats the processing in S4.

When the CPU 21 has determined that the input related to the order is completed (S4: YES), the CPU 21 determines whether the number of orders inputted via the input unit 31 is more than each upper limit value or the total upper limit value (S5: first determination processing).

In the processing in S5, the CPU 21 first determines whether the number of orders inputted via the input unit 31 is more than the upper limit value of each of cartridges 51 to 54. Then, the CPU 21 determines whether the total of the number of orders of all the cartridges 51 to 54 inputted via the input unit 31 is more than the total upper limit value.

When the CPU 21 has determined that the number of orders of each of the cartridges 51 to 54 is more than the upper limit value, or that the total of the number of orders of all the cartridges 51 to 54 is more than the total upper limit value (S5: YES), the CPU 21 determines whether the ink remaining amounts in the cartridges 51 to 54, which are objects of order, detected by the remaining amount sensors 51s to 54s are equal to or less than the lower limit values (S6: second determination processing).

When the CPU 21 has determined that the ink remaining amounts in all the cartridges 51 to 54, which are objects of order, is more than the lower limit values (S6: NO), the CPU 21 requests the input of authentication information via the output unit 32 (S7: authentication request processing).

After the processing in S7, the CPU 21 determines whether the authentication information inputted via the input unit 31 in response to the request in the processing of S7 matches the administrator's authentication information (S8: matching processing). For example, the CPU 21 determines whether the PIN, password, fingerprint, or the like inputted via the input unit 31 matches the administrator's authentication information stored in the ROM 22.

When the CPU 21 has determined that the authentication information inputted via the input unit 31 does not match the administrator's authentication information (S8: NO), the CPU 21 notifies a person who inputted the authentication information disapproval of order, the upper limit value(s), and the total upper limit value via the output unit 32 (S9: notification processing). For example, the fact that the order is disapproved, the upper limit value(s), and the total upper limit value are displayed on the display of the output unit 32. Alternatively, the fact that the order is disapproved, the upper limit value(s), and the total upper limit value are outputted in voice via a speaker of the output unit 32.

After the processing in S9, the CPU 21 ends the program.

When the CPU 21 has determined that the number of orders of each of the cartridges 51 to 54 does not exceed (is equal to or lower than) the upper limit value and has determined that the total of the number orders of all the cartridges 51 to 54 does not exceed (is equal to or lower than) the total upper limit value (S5: NO), the CPU 21 sends order contents (the model number(s) and the number of orders) including the number of orders inputted via the input unit 31 to the order receiving apparatus 2 (see FIG. 1) via the communication unit 10 (S15: sending processing). The order contents sent is checked by a supplier via the order receiving apparatus 2.

When the CPU 21 has determined that the remaining amount of any of the cartridges 51 to 54, which are objects of order, is equal to or less than the lower limit value (S6: YES), and when the CPU 21 has determined that the authentication information inputted via the input unit 31 matches the administrator's authentication information (S8 YES), the CPU 21 executes the processing in S15.

After the processing in S13, similar to the processing in S4, the CPU 21 determines whether the input related to order is completed (S14). When the CPU 21 has determined that the input related to order is not completed (S14: NO), the CPU 21 repeats the processing in S14. When the CPU 21 has determined that the input related to order is completed (S14: YES), the CPU 21 executes the processing in S15.

As described above, according to this embodiment, when the number of orders exceeds (is more than) the upper limit value (S5: YES), the authentication is required (S7) and whether a person performing the order is the administrator is checked (S8). This inhibits an unnecessary order which may otherwise be performed by any user who is not the administrator.

When the CPU 21 has determined in the processing in S5 that the number of orders does not exceed (is equal to or less than) the upper limit value (S5: NO), the CPU 21 sends the number of orders inputted via the input unit 31 to the order receiving apparatus 2 (S15). When the number of orders does not exceed the upper limit value, no authentication is required, and thus the order can be performed as it is. This makes the order easy.

When the CPU 21 has determined that the authentication information input via the input unit 31 in the processing in S8 matches the administrator's authentication information (S8: YES), the CPU 21 sends the number of orders input via the input unit 31 to the order receiving apparatus 2 (S15). When the person performing the order is the administrator, an order exceeding the upper limit value is allowed. This enables a lot of orders as necessary, improving usability.

When the CPU 21 has determined in the processing in S5 that the number of orders is more than the upper limit value (S5: YES), and when the CPU 21 has determined in the processing in S6 that the remaining amount is more than the lower limit value (S6: NO), the CPU 21 requests the authentication (S7). Since the authentication is required when the remaining amount is large, an unnecessary order is reliably inhibited.

When the CPU 21 has determined in the processing in S6 that the remaining amount is equal to or less than the lower limit value (S6: YES), the CPU 21 sends the number of orders input via the input unit 31 to the order receiving apparatus 2. (S15). When the remaining amount is small, no authentication is required. The order can thus be performed as it is. This makes the order easy.

In the processing in S5, the CPU 21 determines whether the number of orders of each of the cartridges 51 to 54 inputted via the input unit 31 is more than the upper limit value. In that configuration, when the printer 1 uses multiple kinds of consumable products, the CPU 21 executes the determination depending on the kind of consumable product. This inhibits an unnecessary order for each of the consumable products.

In the processing in S5, the CPU 21 determines whether the total of the number of orders of all the cartridges 51 to 54 inputted via the input unit 31 is more than the total upper limit value. This inhibits an unnecessary order for all the kinds of consumable products.

The upper limit values used in the processing in S3, S5, and S13 are values obtained by subtracting the order histories y1 to y4 from the initial upper limit values x1 to x4 for the respective cartridges 51 to 54. The total upper limit value used in the processing in S3, S5, and S13 is a value obtained by subtracting the order histories y1 to y4 of all the cartridges 51 to 54 from the initial total upper limit value X. Reflecting the order histories on the determination reliably inhibits an unnecessary order.

When the installation/removal sensors 61s to 64s detect one or more times of installation/removal, the CPU 21 resets the order histories y1 to y4 stored in the ROM 22. Reflecting storages that are not in use on the determination reliably inhibits an unnecessary order.

When the CPU 21 has determined that the administrator has logged in (S2: YES), the CPU 21 does not execute the processing in S5. This simplifies the control process and reduces the burden related to control on the apparatus.

When the CPU 21 has determined that the administrator has not logged in (a user who is not the administrator has logged in, S2: NO), the CPU 21 notifies the user the upper limit value(s) via the order screen for user (S3). Notifying the user who is not the administrator the upper limit value(s) prompts the user to order the consumable product(s) of equal to or less than the upper limit value(s).

When the CPU 21 has determined that the authentication information input via the input unit 31 does not match the administrator's authentication information (S8: NO), the CPU 21 notifies the user disapproval of order (S9). When the person performing the order is not the administrator, an order exceeding the upper limit value is not allowed. This reliably inhibits an unnecessary order which may otherwise be performed by any user who is not the administrator.

In the processing in S9, the CPU 21 further notifies the user the upper limit value(s). This prompts the user to input the number of orders of equal to or less than the upper limit value(s), thus completing the order without interruption.

The embodiment of the present disclosure is explained above. The present disclosure, however, is not limited to the above embodiment. Various changes or modifications in the design may be made without departing from the claims.

Modified Example

Figure 5A:
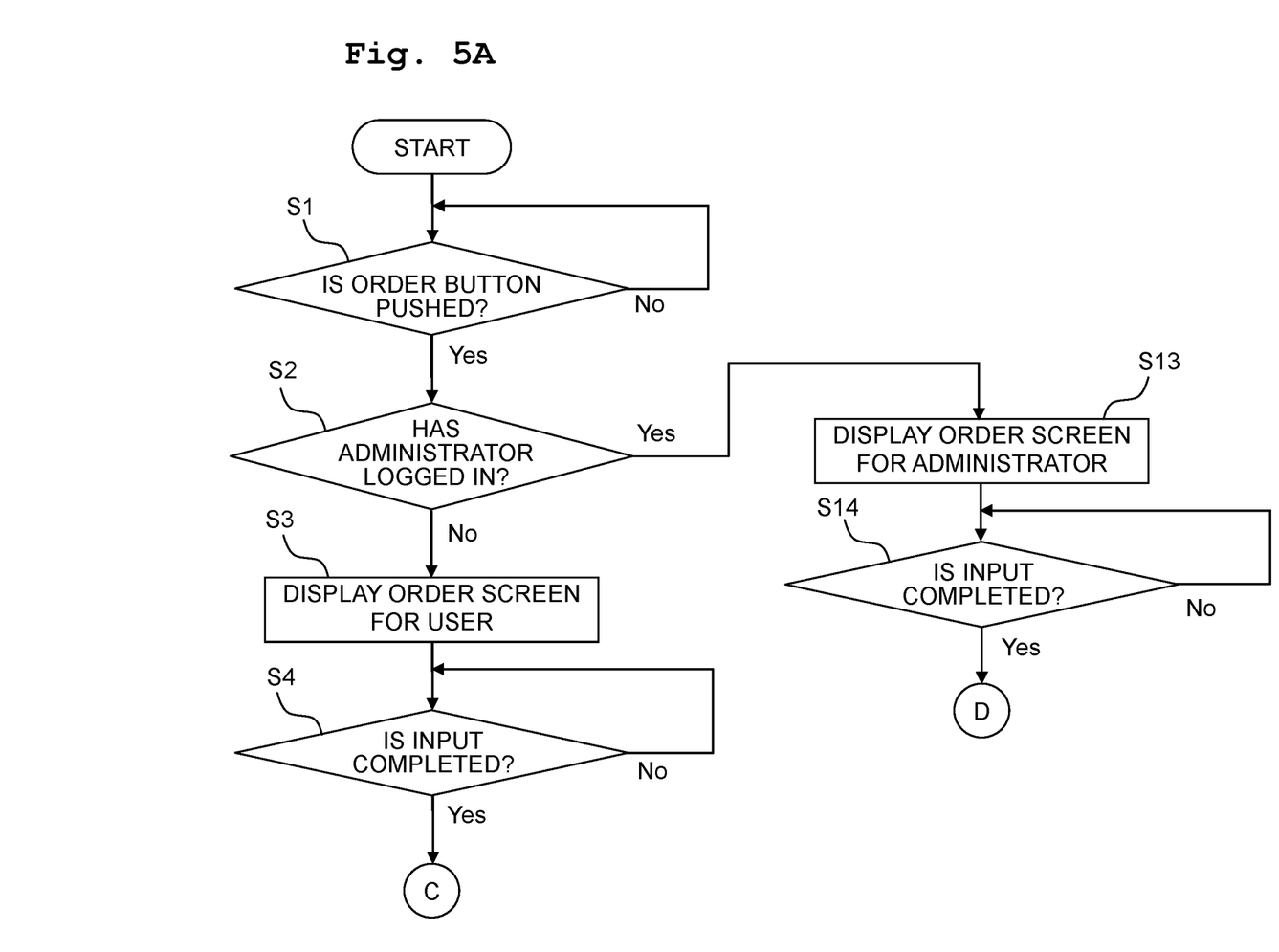
FIGS. 5A and 5B are a flowchart showing an order program according to a modified example of the present disclosure.
Figure 5B:
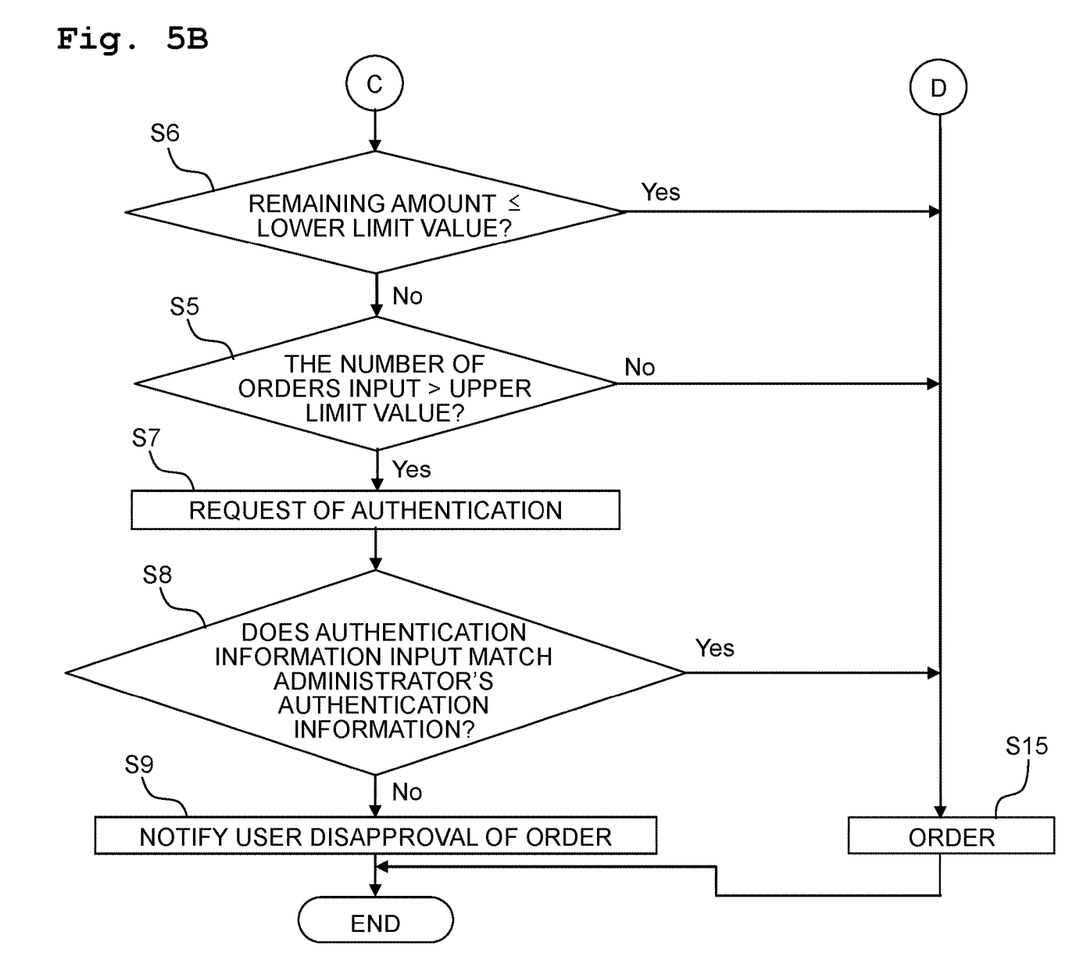

For example, in the above embodiment, the second determination processing (S6) is executed after the first determination processing (S5). The second determination processing (S6), however, may be executed before the first determination processing (S5) (see FIGS. 5A and 5B). In a modified example of FIGS. 5A and 5B, when the CPU 21 has determined in the processing in S6 that the remaining amount is equal to or less than the lower limit value (S6: YES), the CPU 21 sends (S15) the number of orders input via the input unit 31 to the order receiving apparatus 2 without executing the first determination processing (S5).

The second determination processing (determination whether the remaining amounts are equal to or less than the lower limit values: S6) may not be executed. For example, in the above embodiment, when the CPU 21 has determined that the number of orders is more than the upper limit value (S5: YES), the CPU 21 may request authentication without executing the second determination processing (S6). In that case, the remaining amount sensors may be omitted.

The third determination processing (determination whether the administrator's authority information is input: S2) may not be executed. In that case, a certain order screen that does not depend on whether the administrator or any user who is not the administrator orders the consumable product(s) may be displayed, and then the processing subsequent to the processing in S4 may be executed.

When the CPU 21 has determined in the third determination processing that the administrator's authority information is not input (S2: NO), the CPU 21 notifies the person performing the order the upper limit value(s) via the order screen for user in the processing in S3 of the above embodiment. The present disclosure, however, is not limited thereto. The CPU 21 may notify the person performing the order the upper limit value(s) via, for example, voice or audio output from a speaker.

The upper limit value(s) may not be notified in the notification processing (S9) and/or when the CPU 21 has determined that the administrator's authority information is not input (S3).

The reset of the order histories may be executed at any timing (e.g., the timing designated by the administrator) without being limited to the timing at which the the consumable product is installed in or removed from the apparatus. In that case, the installation/removal sensors 61s to 64s may be omitted. Further, the initial upper limit values and the initial total upper limit value may be used as the upper limit value and the total upper limit value without reflecting the order histories on the determination.

When multiple kinds of consumable products are used in the apparatus, the CPU 21 may only determine whether the number of orders of each of the consumable products is more than the upper limit value without determining whether the total of the number of orders of the multiple kinds of consumable products is more than the total upper limit value.

The consumables may be only one kind of consumable product.

In the above embodiment, the consumable products are exemplified by the ink cartridges. The present disclosure, however, it not limited thereto. The consumable products may be a cartridge storing any other liquid than ink (e.g., a treatment liquid by which components of ink are aggregated or precipitated), a toner cartridge, a drum cartridge, an ink ribbon, a paper feeding roller, and sheets or paper.

The image forming apparatus according to the present disclosure is not limited to include the line-type head. The image forming apparatus according to the present disclosure may include a serial-type head (a head discharging liquid on a medium from nozzles while moving in a scanning direction parallel to a sheet width direction). The image forming apparatus according to the present disclosure may include a thermal-type head, a laser-type head, or the like without being limited to the ink-jet head. The image forming apparatus according to the present disclosure may be a facsimile machine, a copy machine, a multifunction peripheral, or the like without being limited to the printer.

What is claimed is:

1. An image forming apparatus configured to form an image by using a consumable product, the apparatus comprising:
   a communication interface configured to communicate with an order receiving apparatus;
   a memory configured to store an initial upper limit value of a number of orders of the consumable product, an upper limit value of the number of orders of the consumable product, a lower limit value of a remaining amount of the consumable product, an order history that is a number of orders of the consumable product in a predefined period, and administrator's authentication information, wherein the upper limit value is a value obtained by subtracting the order history from the initial upper limit value;
   an input device;
   an output device; and
   a controller configured to:
      receive an input of a number of orders of the consumable product via the input device;
      determine whether a number of orders of the consumable product inputted via the input device is more than the upper limit value;
      determine whether the remaining amount of the consumable product is equal to or less than the lower limit value;
      after receiving the input of the number of orders of the consumable product and in a case that the controller has determined that the number of orders is more than the upper limit value and that the remaining amount is more than the lower limit value:
         request input of authentication information, of a user who inputted the number of orders of the consumable product, via the output device, and
         determine whether the authentication information inputted via the input device in response to the request matches the administrator's authentication information; and
      after receiving the input of the number of orders of the consumable product and in a case that the controller has determined that the number of orders is more than the upper limit value and that the remaining amount is equal to or less than the lower limit value:
         send the number of orders inputted via the input device to the order receiving apparatus via the communication interface without requiring the input of the authentication information.

2. The image forming apparatus according to claim 1, wherein the controller is configured to send the number of orders inputted via the input device to the order receiving apparatus via the communication interface, in a case that the controller has determined that the number of orders is equal to or less than the upper limit value.

3. The image forming apparatus according to claim 1, wherein the controller is configured to send the number of orders inputted via the input device to the order receiving apparatus via the communication interface, in a case that the controller has determined that the authentication information inputted via the input device matches the administrator's authentication information.

4. The image forming apparatus according to claim 1, further comprising a remaining amount sensor configured to detect the remaining amount of the consumable product.

5. The image forming apparatus according to claim 1, wherein the consumable product includes a first consumable product and a second consumable product,
   the upper limit value includes a first upper limit value that is an upper limit value of a number of orders of the first consumable product, and a second upper limit value that is an upper limit value of a number of orders of the second consumable product,
   the controller is configured to separately:
      determine whether a number of orders of the first consumable product inputted via the input device is more than the first upper limit value; and
      determine whether a number of orders of the second consumable product inputted via the input device is more than the second upper limit value.

6. The image forming apparatus according to claim 5, wherein the upper limit value further includes a total upper limit value that is an upper limit value of a total of the number of orders of the first consumable product and the number of orders of the second consumable product, and
   the controller is configured to further determine whether the total of the number of orders of the first consumable product and the number of orders of the second consumable products inputted via the input device is more than the total upper limit value.

7. The image forming apparatus according to claim 1, further comprising:
   an installation portion in which the consumable product is installed, and
   an installation/removal sensor that is configured to detect installation/removal of the consumable product with respect to the installation portion,
   wherein the controller is configured to reset the order history stored in the memory, in a case that the installation/removal sensor has detected one or more times of the installation/removal of the consumable product.

8. The image forming apparatus according to claim 1, wherein the memory is configured to further store administrator's authority information,
   the controller is configured to determine whether the administrator's authority information is inputted via the input device, and
   in a case that the controller has determined that the administrator's authority information is inputted via the input device, the controller is configured not to determine whether the number of orders of the consumable product input via the input device is more than the upper limit value.

9. The image forming apparatus according to claim 8, wherein the controller is configured to notify a user the upper limit value via the output device, in a case that the controller has determined that the administrator's authority information is not inputted.

10. The image forming apparatus according to claim 1, wherein the controller is configured to notify a user disapproval of order via the output device, in a case that the controller has determined that the authentication information inputted via the input device in response to the request does not match the administrator's authentication information.

11. The image forming apparatus according to claim 10, wherein the controller is configured to further notify the user the upper limit value via the output device, in a case that the disapproval of order is notified.

12. A method for ordering a consumable product in an image forming apparatus that is configured to form an image by using the consumable product and that includes: a communication interface configured to communicate with an order receiving apparatus; a memory configured to store an initial upper limit value of a number of orders of the consumable product, an upper limit value of the number of orders of the consumable product, a lower limit value of a remaining amount of the consumable product, an order history that is a number of orders of the consumable product in a predefined period, and administrator's authentication information, wherein the upper limit value is a value obtained by subtracting the order history from the initial upper limit value; an input device; and an output device, the method comprising:

receiving an input of a number of orders of the consumable product via the input device;

determining whether a number of orders of the consumable product inputted via the input device is more than the upper limit value, determining whether the remaining amount of the consumable product is equal to or less than the lower limit value, after receiving the input of the number of orders of the consumable product and in a case that the controller has determined that the number of orders is more than the upper limit value and that the remaining amount is more than the lower limit value:

requesting input of authentication information, of a user who inputted the number of orders of the consumable product, via the output device, in a case that the controller has determined that the number of orders is more than the upper limit value and that the remaining amount is more than the lower limit value, and determining whether the authentication information inputted via the input device in response to the request matches the administrator's authentication information, and after receiving the input of the number of orders of the consumable product and in a case that the controller has determined that the number of orders is more than the upper limit value and that the remaining amount is equal to or less than the lower limit value:

sending the number of orders inputted via the input device to the order receiving apparatus via the communication interface without requiring the input of the authentication information.

13. A non-transitory computer-readable medium storing an order program that is executable by an image forming apparatus configured to form an image by using a consumable product, the image forming apparatus including: a communication interface configured to communicate with an order receiving apparatus; a memory configured to store an initial upper limit value of a number of orders of the consumable product, an upper limit value of the number of orders of the consumable product, an order history that is a number of orders of the consumable product in a predefined period, a lower limit value of a remaining amount of the consumable product, wherein the upper limit value is a value obtained by subtracting the order history from the initial upper limit value, and administrator's authentication information, wherein the upper limit value is a value obtained by subtracting the order history from the initial upper limit value; an input device; an output device, and a controller, the order program, when executed by a processor of the controller, causing the controller to:

receive an input of a number of orders of the consumable product via the input device;

determine whether a number of orders of the consumable product inputted via the input device is more than the upper limit value, determine whether the remaining amount of the consumable product is equal to or less than the lower limit value, after receiving the input of the number of orders of the consumable product and in a case that the controller has determined that the number of orders is more than the upper limit value and that the remaining amount is more than the lower limit value:

request input of authentication information, of a user who inputted the number of orders of the consumable product, via the output device, in a case that the number of orders is more than the upper limit value and that the remaining amount is more than the lower limit value, and determine whether the authentication information inputted via the input device in response to the request matches the administrator's authentication information, and after receiving the input of the number of orders of the consumable product and in a case that the controller has determined that the number of orders is more than the upper limit value and that the remaining amount is equal to or less than the lower limit value:

send the number of orders inputted via the input device to the order receiving apparatus via the communication interface without requiring the input of the authentication information.

* * * * *